Oct. 9, 1956        A. R. MILNE        2,765,668
ANTI-BACKLASH GEARING
Filed June 2, 1955
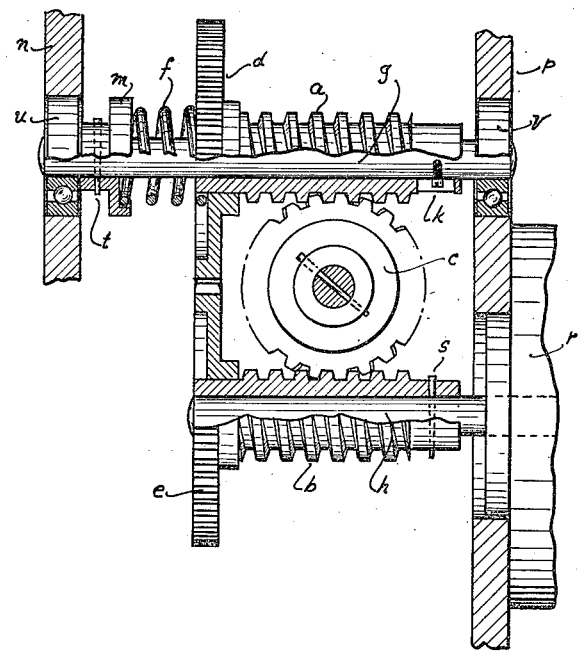

United States Patent Office 2,765,668
Patented Oct. 9, 1956

2,765,668
ANTI-BACKLASH GEARING

Allen R. Milne, Victoria, British Columbia, Canada, assignor to National Research Council, Ottawa, Ontario, Canada, a corporation of Canada Application June 2, 1955, Serial No. 512,839

6 Claims. (Cl. 74—409)

This invention relates to improvements in backlash take-up devices, and is concerned in particular with the provision of a device to be incorporated in worm type gearing.

Worm gearing is especially susceptible to backlash and large errors in the response of the driven member can often arise as a result of comparatively small inaccuracies in the interengaging portions of the worm and worm-wheel. This fact has necessitated the use of precision gearing in applications where accuracy is of paramount importance, such as servo-mechanisms.

The primary object of the present invention is the provision of a simple backlash take-up device that will enable results comparable with those obtained with precision worm gearing, to be obtained from gearing of much lower quality, with consequent considerable saving in overall cost.

In its broadest aspect the invention consists of a backlash take-up device comprising a driving worm, a driven worm-wheel in rotation-transmitting relationship with said driving worm, a slack-absorbing worm also in rotation-transmitting relationship with said worm-wheel, a gear train of a character having inherently small backlash arranged between said worms to ensure synchronous rotation thereof and in a manner to permit at least one of said worms a degree of freedom of movement longitudinally of its axis, stop means limiting longitudinal movement of one of said worms, and spring means resiliently urging the other of said worms longitudinally in a direction to urge said first worm, through the intermediary of the worm-wheel, towards said stop means.

The form of gear train used is preferably a pair of spur wheels having a comparatively large number of teeth, such spur wheels being secured each to one of the worms which are arranged with their axes parallel with each other. The spring means, which conveniently may take the form of a helical compression spring, will preferably act on the slack-absorbing worm, the stop means being provided on the shaft of the driving worm. This shaft will normally be the shaft of a motor, and will thus be limited in its longitudinal play by internal parts of the motor, these parts then forming the said stop means.

One construction in accordance with the invention is illustrated by way of example in the accompanying drawing.

Such drawing shows a fragment of a motor $r$, such as a servo-motor, having a drive spindle $h$. A worm $b$ is secured to the spindle $h$ by means of a pin $s$ and drives a worm-wheel $c$ which is connected to the member to be driven (not shown). The purpose of the remaining parts of the apparatus illustrated is to avoid the two sources of backlash that normally would exist between the worm $b$ and the worm-wheel $c$. These two sources of backlash are firstly the normal and unavoidable clearance between the worm $b$ and the teeth of the worm-wheel $c$, and secondly the longitudinal end play of the motor shaft $h$.

The object of the invention is attained by the provision of a spur gear $e$ firmly mounted on hte end of the worm $b$, preferably by being pressed thereon, and a second spur gear $d$ meshing with the spur gear $e$ and similarly mounted on a second or "slack-absorbing" worm $a$ identical with the worm $b$, and also in engagement with the worm-wheel $c$. The worm $a$ and spur gear $d$ are freely slidably mounted on a shaft $g$, although keyed by a grub screw $k$ to rotate with such shaft. The shaft $g$ is mounted in bearings $u$ and $v$ supported by fixed plates $n$ and $p$ respectively, and has keyed thereto by means of a pin $t$, a boss $m$ mounted around said shaft $g$ in spaced relation to the spur gear $d$. A helical compression spring $f$ is mounted between the boss $m$ and spur gear $d$ to force these two parts away from one another. This spring $f$ thus urges the worm $a$ to the right as shown in the drawing, the two spur gears $d$ and $e$ being of sufficient tooth length to enable a degree of relative sliding motion without loss of mesh. This forcing to the right of the worm $a$ applies an end thrust in the opposite direction, i. e. to the left, on the servo-motor shaft $h$, using the worm-wheel $c$ as a lever. The pressure applied in this way by the spring $f$ is maintained sufficiently great to ensure that the resultant forces between the worms $a$ and $b$ and worm-wheel $c$ are greater than any opposing forces that will be exerted on these parts by the motor $r$. The lefthand edges of the lower teeth of the worm-wheel $c$ will thus always be maintained in close contact with the righthand edges of the convolutions of the worm $b$ which ever direction the motor $r$ may rotate.

The spur gears $d$ and $e$ are of the same pitch diameter and have a large number of teeth so that the backlash in these gears causes a rotational error much smaller than would normally occur between a worm and worm-gear. This error can normally be ignored in practice.

The main practical utility of the present invention is that it enables relatively poor quality gears to be employed with results comparable with those normally only obtained with the very best quality gears. The provision of the spring, which yields to any imperfection in the gears, is very much cheaper than the cost of cutting the high quality gears.

It is not essential that the slack-absorbing worm engage directly the same worm-wheel as is engaged by the driving worm. Each worm could, for example, engage a separate worm-wheel, the two worm-wheels being secured on a common shaft. The important requirement is that one worm-wheel should be in "rotation-transmitting relationship" with both worms.

Moreover, it is not essential that the spring act on the worm $a$, although this is preferred. The spring could act on the spindle $h$ of the motor, i. e. on the worm $b$, provided there existed sufficient end-play on the spindle $h$ and that this end-play were greater than the end-play of the worm $a$ which latter would then be mounted with as litle end-play as could practically be obtained. Normally, the comparatively small end-play in servo-motors will render the illustrated form of construction the more practical.

I claim:

1. A blacklash take-up device comprising a driving worm, a driven worm-wheel in rotation-transmitting relationship with said driving worm, a slack-absorbing worm also in rotation-transmitting relationship with said worm-wheel, a gear train of a character having inherently small backlash arranged between said worms to ensure synchronous rotation thereof and in a manner to permit at least one of said worms a degree of freedom of movement longitudinally of its axis, stop means limiting longitudinal movement of one of said worms, and spring means resiliently urging the other of said worms longitudinally in a direction to urge said first worm, through the intermediary of the worm-wheel, towards said stop means.

2. A backlash take-up device, comprising a driving worm, a driven worm-wheel in rotation-transmitting relationship with said driving worm, a slack-absorbing worm also in rotation-transmitting relationship with said worm-wheel, a gear train of a type of inherently small backlash arranged between said worms to ensure synchronous rotation thereof and in a manner to permit said slack-absorbing worm a degree of freedom of movement longitudinally of its axis, stop means limiting longitudinal movement of said driving worm, and spring means resiliently urging said slack-absorbing worm longitudinally in the direction to urge said driving worm, through the intermediary of the worm-wheel, towards said stop means.

3. A backlash take-up device, comprising a motor having a shaft with a degree of longitudinal movement, a driving worm secured to said shaft, a driven worm-wheel in rotation-transmitting relationship with said driving worm, a slack-absorbing worm also in rotation-transmitting relationship with said wheel, a gear train of a character having inherently small backlash arranged between said worms to ensure synchronous rotation thereof and in a manner to permit said slack-absorbing worm a degree of freedom of movement longitudinally of its axis, and spring means resiliently urging said slack-absorbing worm longitudinally of its axis.

4. A backlash take-up device as claimed in claim 1 wherein said gear train comprises a first spur gear secured to said driving worm and a second spur gear secured to said slack-absorbing worm and meshing with said first spur gear, the longitudinal axes of said worms being parallel to each other.

5. A backlash take-up device as claimed in claim 2 wherein said gear train comprises a first spur gear secured to said driving worm and a second spur gear secured to said slack-absorbing worm and meshing with said first spur gear, the longitudinal axes of said worms being parallel to each other.

6. A blacklash take-up device as claimed in claim 3 wherein said gear train comprises a first spur gear secured to said driving worm and a second spur gear secured to said slack-absorbing worm and meshing with said first spur gear, the longitudinal axes of said worms being parallel to each other.

No references cited.